United States Patent
Xu et al.

[19]

[11] Patent Number: 5,980,040
[45] Date of Patent: Nov. 9, 1999

[54] PINHOLE LENS AND CONTACT LENS

[75] Inventors: David H. Xu, Los Angeles, Calif.; David Miller, Boston, Mass.; Leroy Meshel, Daly City, Calif.

[73] Assignee: Wesley Jessen Corporation, Des Plaines, Ill.

[21] Appl. No.: 08/885,696

[22] Filed: Jun. 30, 1997

[51] Int. Cl.⁶ ....................................................... G02C 7/04
[52] U.S. Cl. ........................... 351/162; 351/161; 351/177; 359/738
[58] Field of Search ........................... 351/160 R, 160 H, 351/161, 162, 177; 359/738, 739

[56] References Cited

U.S. PATENT DOCUMENTS

| | | |
|---|---|---|
| Re. 25,286 | 11/1962 | de Carle . |
| Re. 29,229 | 5/1977 | Girard et al. . |
| 1,955,047 | 4/1934 | Beach . |
| 2,405,989 | 8/1946 | Beach . |
| 3,004,470 | 10/1961 | Rühle . |
| 3,037,425 | 6/1962 | de Carle . |
| 3,279,878 | 10/1966 | Long . |
| 3,298,771 | 1/1967 | Ratliff, Jr. . |
| 3,472,581 | 10/1969 | Bronstein . |
| 3,482,906 | 12/1969 | Volk . |
| 3,614,218 | 10/1971 | Bronstein . |
| 3,662,040 | 5/1972 | Urbach et al. . |
| 3,726,587 | 4/1973 | Kendall . |
| 3,794,414 | 2/1974 | Wesley . |
| 4,055,378 | 10/1977 | Feneberg et al. . |
| 4,073,579 | 2/1978 | Deeg et al. . |
| 4,162,122 | 7/1979 | Cohen . |
| 4,302,081 | 11/1981 | Tsuetaki . |
| 4,338,005 | 7/1982 | Cohen . |
| 4,340,283 | 7/1982 | Cohen . |
| 4,418,991 | 12/1983 | Breger . |
| 4,525,043 | 6/1985 | Bronstein . |
| 4,549,794 | 10/1985 | Loshaek et al. . |
| 4,573,775 | 3/1986 | Bayshore . |
| 4,580,882 | 4/1986 | Nuchman et al. . |
| 4,593,981 | 6/1986 | Scilipoti . |
| 4,614,413 | 9/1986 | Obssuth . |
| 4,636,211 | 1/1987 | Nielsen et al. . |
| 4,637,697 | 1/1987 | Freeman . |
| 4,693,572 | 9/1987 | Tsuetaki et al. . |
| 4,702,573 | 10/1987 | Morstad . |
| 4,704,016 | 11/1987 | de Carle . |
| 4,728,182 | 3/1988 | Kelman . |
| 4,752,123 | 6/1988 | Blaker . |

(List continued on next page.)

FOREIGN PATENT DOCUMENTS

| | | |
|---|---|---|
| A-52069/96 | 11/1996 | Australia . |
| 0 140 063 | 5/1985 | European Pat. Off. . |
| 1557212 | 2/1969 | France . |
| 1 199 019 | 8/1965 | Germany . |
| 32 22 099 | 12/1983 | Germany . |
| 1-319729 | 1/1989 | Japan . |
| 2-281229 | 2/1990 | Japan . |
| 2-79016 | 2/1990 | Japan . |
| 939016 | 10/1963 | United Kingdom . |
| 2 086 605 | 5/1982 | United Kingdom . |
| 2 129 155 | 5/1984 | United Kingdom . |
| WO 86/03961 | 7/1986 | WIPO . |
| WO 87/00299 | 1/1987 | WIPO . |

OTHER PUBLICATIONS

Archives of Ophthalmology, Peter Zacharia, David Miller, MD "Holes in Clear Lenses Demonstrate a Pinhole Effect," vol. 108, (Apr. 1988).

*Primary Examiner*—Scott J. Sugarman
*Attorney, Agent, or Firm*—Brinks Hofer Gilson & Lione

[57] ABSTRACT

A contact lens comprising an optically transparent lens body having a concave surface adapted to the patient's eye curvature and a convex surface. The lens has three regions: (1) an annular region of a first optical power; (2) at the center of said annular region, which is also at the optical center of said lens, a substantially pinhole-like aperture; and (3) a second larger annular region exterior to the first annular region.

20 Claims, 2 Drawing Sheets

U.S. PATENT DOCUMENTS

| | | |
|---|---|---|
| 4,759,763 | 7/1988 | Bissonette et al. . |
| 4,813,777 | 3/1989 | Rainville et al. . |
| 4,861,152 | 8/1989 | Vinzia et al. . |
| 4,869,587 | 9/1989 | Breger . |
| 4,874,234 | 10/1989 | Wichterle . |
| 4,890,912 | 1/1990 | Visser . |
| 4,890,913 | 1/1990 | de Carle . |
| 4,898,461 | 2/1990 | Portney . |
| 4,932,970 | 6/1990 | Portney . |
| 4,936,672 | 6/1990 | Capez . |
| 4,938,583 | 7/1990 | Miller . |
| 4,955,904 | 9/1990 | Atebara et al. . |
| 4,971,432 | 11/1990 | Koeniger . |
| 4,995,715 | 2/1991 | Cohen . |
| 5,071,244 | 12/1991 | Ross . |
| 5,076,683 | 12/1991 | Glick . |
| 5,129,718 | 7/1992 | Futhey et al. . |
| 5,141,301 | 8/1992 | Morstad . |
| 5,166,711 | 11/1992 | Portney . |
| 5,166,712 | 11/1992 | Portney . |
| 5,170,192 | 12/1992 | Pettigrew et al. . |
| 5,198,844 | 3/1993 | Roffman et al. . |
| 5,225,858 | 7/1993 | Portney . |
| 5,245,367 | 9/1993 | Miller et al. . |
| 5,260,727 | 11/1993 | Oksman et al. ................ 351/162 |
| 5,270,744 | 12/1993 | Portney . |
| 5,296,880 | 3/1994 | Webb . |
| 5,344,447 | 9/1994 | Swanson . |
| 5,349,394 | 9/1994 | Freeman et al. . |
| 5,404,183 | 4/1995 | Seidner . |
| 5,406,341 | 4/1995 | Blum et al. . |
| 5,408,281 | 4/1995 | Zhang . |
| 5,430,504 | 7/1995 | Muckenhirn et al. . |
| 5,434,630 | 7/1995 | Bransome ........................ 351/162 |
| 5,436,678 | 7/1995 | Carroll . |
| 5,483,304 | 1/1996 | Porat . |
| 5,485,228 | 1/1996 | Roffman et al. . |
| 5,493,350 | 2/1996 | Seidner . |
| 5,517,260 | 5/1996 | Glady et al. . |
| 5,526,071 | 6/1996 | Seidner et al. . |
| 5,528,321 | 6/1996 | Blum et al. . |
| 5,532,768 | 7/1996 | Onogi et al. . |
| 5,541,678 | 7/1996 | Awanohara et al. . |
| B1 5,080,472 | 10/1995 | Gupta . |

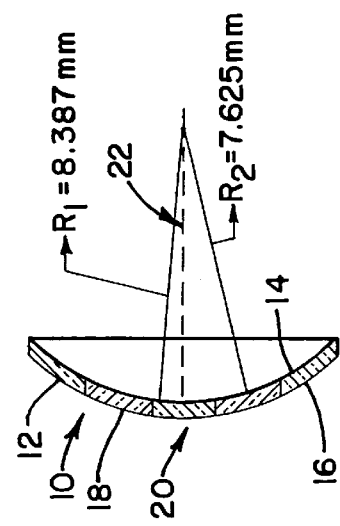
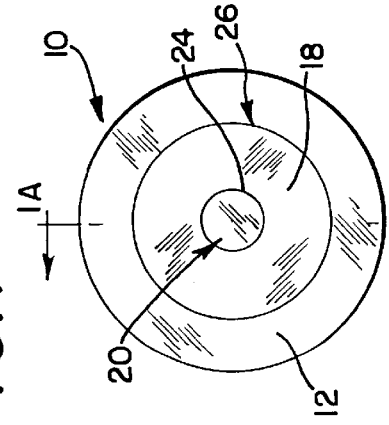
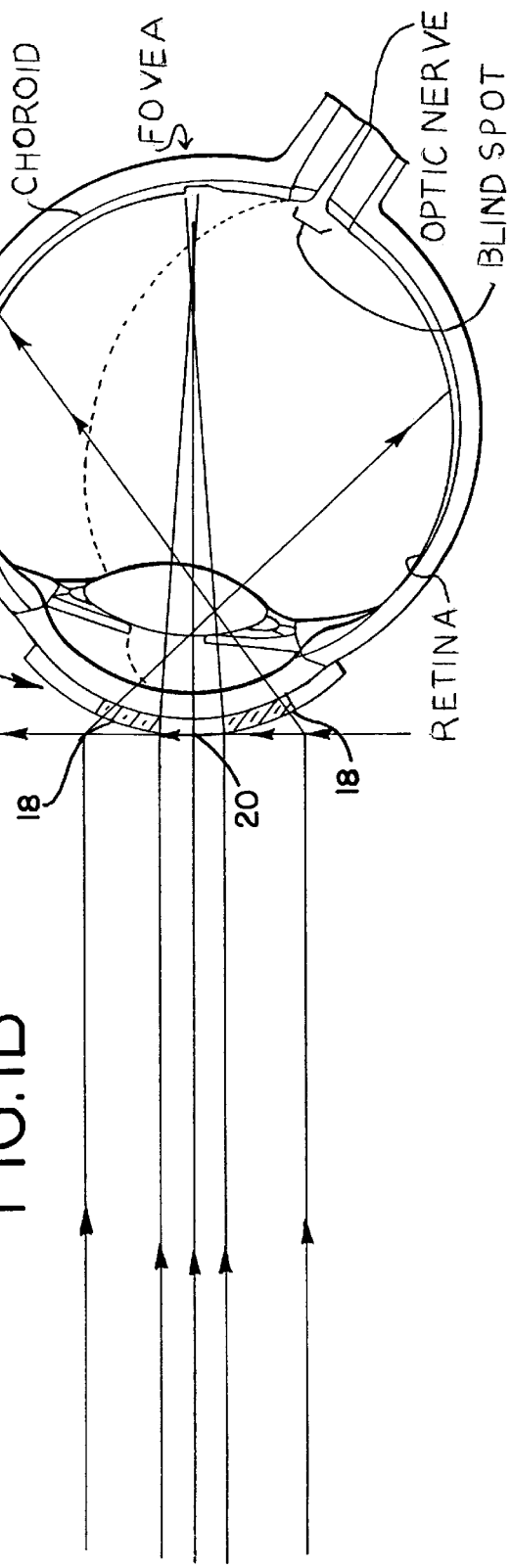

PINHOLE LENS AND CONTACT LENS

FIELD OF THE INVENTION

This invention relates to optical lenses, such as for vision enhancement or correction and, in particular, a contact lens utilizing a "pinhole" aperture with an adjacent region having an optical power serving to direct light through the lens, for improved brightness, but outside of the focus of the pinhole aperture. As will be seen hereafter, the invention is also considered to have broad application in optical instruments.

BACKGROUND OF THE INVENTION

Contact lenses are commonplace today. Individuals with minor vision ailments can typically acquire and use these lenses in place of prescription eye glasses. This is not so true, however, for individuals having poor vision, or for those presbyopic persons requiring bifocal glasses. For example, presbyopic individuals can opt for bifocal contact lenses, but may find it difficult to maintain focus during eye movement, or only see clearly at one viewing distance.

The need to develop more versatile lenses has led designers to pinhole contact lenses. These lenses utilize theories of pinhole imaging, commonly understood in optics as a method to reduce geometrical aberrations, e.g., astigmatism, spherical aberration, and coma. By restricting a person's vision to a small "pinhole" aperture, visual deficiencies are greatly reduced, or even effectively removed. Unfortunately, the utility of this technology has met with limited success. For instance, while the classic pinhole lens device produces an enhanced depth of focus, which increases with smaller aperture, smaller apertures typically result in degradation of the quality of the image due to diffraction, among other things. The denser the opacity of the region surrounding, i.e., defining, the pinhole lens also affects the contrast of the focused image. If the region surrounding the pinhole is allowed to pass some light, such as to improve acuity under low light conditions, the image contrast is degraded.

"Multiple Focal Contact Lenses," as described in U.S. Pat. No. 3,794,414, was one attempt to develop small-aperture contact lenses. This approach combined a pinhole-like aperture with radial slits and scalloped masking regions on a contact lens to supposedly correct both peripheral vision and the effects related to decentered contact lenses. It was considered that some disadvantageous diffraction effects were introduced by this type of design.

In addition, it is important to consider the normal functioning of the human pupil. A large drawback in pinhole imaging is energy starvation. Small-aperture pinhole lenses improve image quality, but at the same time block significant amounts of light energy from reaching the retina. Under dim lighting conditions, a human pupil normally dilates. Without proper consideration, a small-aperture contact lens would place a person into equivalent darkness, even though the lighting is only dim or low.

Pinhole correction together with the normal functioning of the human pupil is considered in U.S. Pat. No. 4,955,904, which presents an intraocular lens surgically implanted within the eye. The patent, entitled "Masked Intraocular Lens and Method for Treating a Patient With Cataracts," affords cataract patients some form of vision correction through surgery. The intraocular lens is masked to form a pinhole that accommodates the function of the human pupil under different lighting conditions. But, intraocular lenses have operational and other drawbacks. They are not contact lenses; surgery is required and the lens must be permanently implanted with precision through the use of man-made loops. Furthermore, because of material requirements for implantation, these impenetrable lenses can transmit little or no oxygen, a feature widely available in contact lenses. Contact lenses, in addition, are conveniently installed and removed by the wearer, and are held in place on the eye through tear tension.

U.S. Pat. No. 5,245,367, entitled "Annular Mask Contact Lenses," describes a lens with a small pinhole-like aperture surrounded by an annular mask. The central aperture created by the pinhole, corrects the patient's vision, while the lens body outside the annular mask enables the patient to view both near and far objects comfortably, under differing light conditions. The lens body described in the '367 patent sizes the annular mask to allow the dilated pupil to extend beyond the mask radius, to thereby allow more light to pass under low-light conditions. Additionally, optical (e.g., corrective) power is disclosed for both the aperture area and the area outside of the mask; but not within the mask region.

Despite these and other advances, pinhole-type contact lenses with improved corrective ability are desirable.

SUMMARY OF THE INVENTION

Accordingly, one object of this invention is to provide an improved small-aperture pinhole lens having a region adjacent the aperture, such as in the form of an annulus defining the pinhole itself at its center, which is optically powered to redirect light passing through this region outside of the focal area of the pinhole lens, such as to the retinal periphery beyond the foveal area when the invention takes form as a corrective lens for vision. In essence, the light passing through the annular optically powered region impinges on the retina to provide light sensation, but in a manner which does not "interfere" with the light rays passing to focus through the pinhole. The low-light deficiency previously symptomatic of pinhole lenses is thus solved, without a significant reduction in visual quality.

The present invention provides, in one aspect, a contact lens with a transparent lens body and two curvatures. The lens body has a concave surface, adapted to the patient's eye curvature, opposite a convex surface. The lens body has an annulus region that surrounds a small, so-called pinhole aperture. The lens body is designed to correct the patient's vision to a focal point between near and far objects.

The annular region is arranged to rest above the patient's pupil and is also designed to improve the patient's vision, but in a manner different than the lens surface at the site of aperture. The contact lens thus created has an optical power in this annular region, which "increases" the pinhole effect and improves image contrast by defocusing light (vis. the pinhole focus) from this annular region which would otherwise interfere with the pinhole focus. The surface of the lens outside the annular region is designed to allow added light to reach the dilated pupil as brightness levels decrease.

In its basic sense, the pinhole aperture can simply be a light-passing region of zero power (or provided with a plus or minus power). The surrounding region need not be an annulus, although this shape is considered optimal for a contact lens, but is of a different power from that of the pinhole. Light passed through this surrounding region is "defocused" relative to the focal point of the pinhole aperture. That is, the light through the surrounding region is directed substantially outside of the pinhole focus. This can be by way of a shorter focal length than that of the pinhole, thus spreading the light through the surrounding region beyond the pinhole focus, or through a diverging lens shape for the surrounding region which again spreads the light outside of the pinhole focus, or some refractive arrangement to bend the light outside of the pinhole focus. Ideally, light passed by the surrounding region impinges in an area where it serves to provide illumination for improved brightness without interfering with the imaging of the pinhole lens. In the context of a lens for improved vision, this would be a surrounding region which directs light beyond the foveal area yet still on the retina.

It is considered that the greater the defocusing effect of the surrounding region, the greater the image contrast produced. Some consideration must be given to the possibility of undesirable amounts of glare, reflection, aberration and diffraction that may be introduced if the difference in thickness between the pinhole area and the surrounding region results in an abrupt transition zone. Light absorption or reflection by the surrounding region is also contemplated within the scope of the invention, such as to improve image contrast, reduce glare or simply for cosmetic purposes.

The surrounding region also need not be of single optic power, but could include, for instance an outer corrective annular segment which corrects for distance refractive error in dim light conditions (i.e., as the pupil dilates, it picks up this corrective segment for distance focus).

According to another aspect of the invention, the convex lens surfaces both inside and outside the annular region may also be optically powered. The lens body thus provides plural optical corrections. The central aperture region can be optically powered to correct the patient's vision for a focal point between near and far objects; the lens body in the annular region is powered to provide the improved pinhole effect, while the lens body outside the annular region is optically powered to correct the patient's vision for far objects. This arrangement, together with the pupil-sized annular "defocusing" region, enables the patient to view both near and far objects comfortably, and under differing light conditions, in an improved manner.

The lens of the present invention has several advantages over prior lenses including increased contrast, enhanced visual acuity and increased depth of focus for the wearer of the lens, as well as reduced manufacturing tolerance. It may be applied as a contact lens, intraocular lens, intra-corneal lens, or in optical mechanisms where a pinhole focus and improved brightness are desired. It is also considered to improve pupil decentration dependency in a contact lens. That is, with a surrounding region that passes a significant amount of light (i.e., which has a very low opacity), optical blur from diffractive effects is considered to be greatly reduced when the lens becomes decentered relative to the undilated pupil.

These and other aspects and features of the invention will be further understood when considered in conjunction with the following detailed description of embodiments of the invention.

BRIEF DESCRIPTION OF THE DRAWINGS

FIG. 1 is a plan view of a contact lens constructed in accordance with the invention;

FIG. 1A is a sectional view of the lens of FIG. 1 taken along line 1A—1A;

FIG. 1B schematically illustrates the intended effect of the lens of FIG. 1 in general;

DETAILED DESCRIPTION OF ILLUSTRATED EMBODIMENTS

Figure 2:
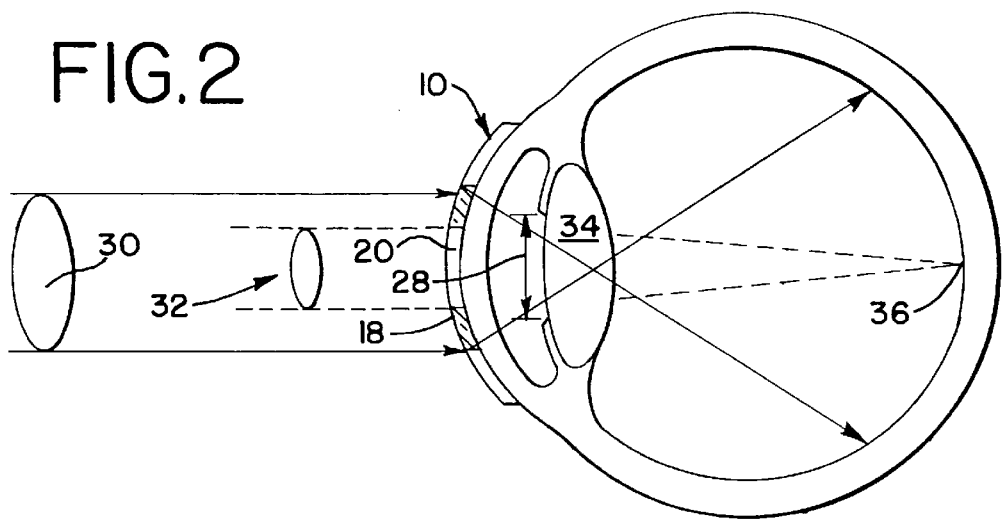
FIG. 2 illustrates a contact lens according to FIG. 1 and its relation to the human pupil during bright light conditions.

The invention has presently found particular application as a contact lens. As noted above, however, the invention is considered to have far ranging applications and potential adaptations.

A contact lens as illustrated herein generally comprises an optically transparent lens body having a concave surface adapted to the patient's eye curvature and a convex outer surface. The lens has three regions: (1) an annular region of a first optical power; (2) at the center of the annular region, which is also at the optical center of the lens, is a substantially pinhole-like aperture which can include a second optical power different from the first optical power; and (3) a second larger annular region exterior to the first annular region, which may also have yet another optical power. The first and second annular regions may preferably be blended at their intersection, rather than abruptly changing between regions.

During bright lighting conditions when the patient's pupil constricts, vision is generally restricted to the small aperture, i.e., the pinhole, with the first annular region comprising a light "mask," particularly if provided with some degree of opacity.

During low light conditions when the patient's pupil dilates, light is allowed to the pupil through the second annular region, permitting additional light to pass. As understood herein, however, this "mask" region is a "defocusing" region for allowing at least some light to pass therethrough but impinging on the retina substantially outside of the pinhole focus, i.e., outside the fovea.

FIGS. 1 and 1A show a contact lens 10 constructed in accordance with the invention having a transparent lens body 12 fabricated with two curvatures, a concave surface 14, and a convex surface 16. The concave surface 14 is optically powered to adapt to the patient's eye curvature. The convex surface 16 is optically powered to correct the patient's vision. Focusing is achieved both by the contact lens 10 and by the eye's own refractive capability.

The lens body 12 can be constructed with material to form a hard, gas (e.g., oxygen) permeable, or soft contact lens 10. The outer diameter of the lens body 12 is approximately 8–14 mm, depending upon the patient's eye size, but is conventionally sized.

The contact lens 10 has an annular region 18. This annular region 18 is optically arranged to form a small, pinhole-like aperture 20 at approximately the center of the lens body and at the patient's optical line-of-sight 22. The annular region is surrounded by a larger, exterior annular region 12.

The pinhole-like aperture 20 is formed by the inner diameter of the annular region. The pinhole aperture 20 is sized to provide pinhole imaging improvement for the patient's vision deficiency. The aperture 20 must be smaller than the patient's pupil size during bright light conditions, or else no vision improvement would be realized under the brighter conditions. Thus the aperture 20 must be smaller than approximately 4 mm, which is a typical human pupil diameter under bright lighting conditions. Since the contact lens may not always center over the patient's pupil, the lens is preferably fitted first, and the position of the annulus noted, and the lens then made to special order according to the fitting so the annulus centers over the patient's pupil.

At the same time, the pinhole aperture 20 should be greater than the diameter in which diffraction effects start to degrade image quality. In general, the benefits achieved by the pinhole aperture 20 can be destroyed by diffraction if very small apertures are incorporated into the pinhole contacts lenses. Such small apertures that have these adverse results include radial slits and scalloped patterns. Diffraction can actually increase the blurring of the retinal image such that the patient's vision is degraded rather than improved. Preferably, the inner diameter of the annular region is between about 0.5 and about 2.5 mm. The pinhole area is preferably transparent, although a minimum opacity can be tolerated.

The annular region 18 has an outer diameter between about 1.0 and about 8.0 mm. In addition, the radial width of the annular region 18, from the inside edge 24 to the outside edge 26, is preferably 0.75 mm to 1.0 mm. This dimension is sized in the practice of the invention to accommodate the normal function of the human pupil. It can be appreciated that the dimensions of the annular region 18 can be adjusted for a particular patient. For example, the annular region 18 can be sized for a particular pupil, or further optimized for a desired visual correction.

To this point, the foregoing contact lens structure is, in a broad sense, essentially as described in U.S. Pat. No. 5,245,367.

In the present invention, the "opacity" of the annular region is between 1 and 100%. Those skilled in the art will appreciate that the opacity of the annular region of the lens can be controlled in several ways. For example, a light-blocking element can be incorporated within the body of the contact lens to accomplish this function. Alternatively, a coating which transmits light somewhere between 1–100% can be applied to the lens body.

Whether incorporated into the body of the lens or coated thereon, resulting annular region 18 can have varying levels of opacity. A higher level of opacity is generally desired for maximal visual sharpness. However, a person may want a lower level of opacity to avoid a sense of visual dimness, i.e., to attain more brightness. The optical opacity of the annular region according to the invention can vary from lens to lens, as well as within a lens, to attain vision having a selected balance of factors.

In a marked departure from the known prior art, the annular region 18 is optically powered different from that of the pinhole area 20. The optical power of the annular region can be either plus or minus relative to that of the pinhole area. For example, a lens has been constructed in accordance with the invention having the pinhole area 20 with a diopter of minus 3 and the annular region with a diopter of plus 5, for a differential between the annular region and the pinhole area of plus 2 diopter. An actual light blocking opacity of between 10% and about 30% was further considered desirable.

The larger annular region 12, located exterior to the annular region 18, is also preferably transparent, although some opacity can be tolerated. The larger annular region 12 is separated from the annular region 18 by outer edge 26. The outer edge 26 is not an abrupt demarcation, but is rather blended between these two regions.

Constructed in this fashion, the contact lens 10 operates as a pinhole imager and increases the depth of focus. Light rays from a single object in the field of view, and entering the pinhole aperture 20, are more tightly imaged at the retina than in the absence of the contact lens 10. This reduces the blurring at the retinal image and increases the patient's visual acuity. Normally, the typical geometrical vision deficiencies encountered in patients, like myopia, hyperopia, astigmatism, and presbyopia, spread out the light rays reaching the retina from a single object point in the field of view, thereby reducing image contrast. The pinhole aperture 20 limits these light rays to a smaller bundle entering the eye pupil, and thereby improves image contrast. Visual acuity is also improved over a large range of viewing distances, because defocus effects are less noticeable with the reduced blurring of the image at the retina.

As shown in FIG. 1B, the optical power of the annular region 18 serves to "defocus," or bend, the light passing therethrough to impinge on the retina at a radial distance generally outside of the fovea. In this manner, light through the annular region serves to add to at least the subjective brightness perceived by the wearer, but does not "interfere" with the image produced by the pinhole lens.

FIG. 2 illustrates the relationship of the annular region contact lens 10 of FIGS. 1 and 1A to the patient's contracted pupil 28 during bright light conditions. Light rays 30 show the bundle of light from a far object point which passes through the patient's pupil 28 without the contact lens 10. Light rays 32 show the smaller bundle of light from the same object point which passes through the patient's pupil with the contact lens 10. Light rays 32 pass by the edge of the pinhole aperture 20 and do not pass by the edge of the human pupil 28. The light rays 32 are focused by the contact lens 10 and by the eye's refractive portions 34.

Under normal viewing, without the contact lens 10, the patient's retina 36 would receive all the light energy from the light rays 30. The light rays 30 would pass by the edge of the eye pupil 28 and eventually reach the retina 36, where the light energy is converted into signals perceived by the brain.

However, while viewing through the contact lens 10 under bright light, or daylight, conditions, the pinhole aperture 20 created by the annular region 18 restricts the effective light transmitting aperture so that only the light rays 32 pass through the eye pupil 28 and to the retina 36. The optical power of the annular region 18 serves to alter the path of the light rays impinging thereon away from the focus of the pinhole, while still allowing light to pass (where a light-blocking mask for the annular region is less than 100% opaque). Because the light rays 32 constitute a smaller pattern impinging upon the eye's refractive portions 34, as compared to the light rays 30, the aberrations at the retina 36 are reduced. Yet the present invention increases image contrast, visual acuity, depth of focus and brightness.

Figure 3:
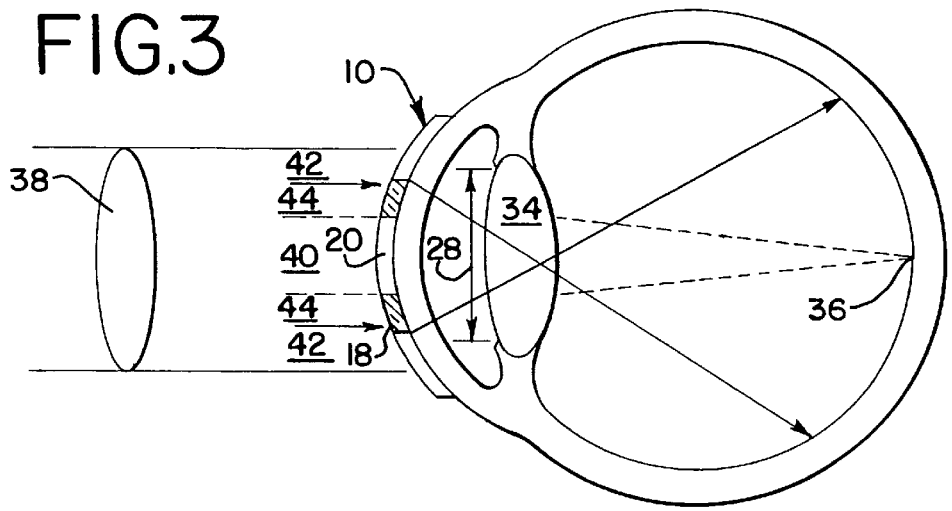
FIG. 3 illustrates a contact lens according to FIG. 1 and its relation to the human pupil during lower lighting conditions.

FIG. 3 shows the relationship of the annular mask contact lens 10 to the patient's dilated pupil 28 during lower light conditions. The bundle of light rays 38 from the same object point strikes the contact lens 10 in the regions 40, 42, and 44, and are focused at the retina 36 by the contact lens 10 and the eye's refractive portions 34. The eye pupil 28 is illustratively shown as the patient's limiting aperture under normal viewing without the contact lens 10, where the patient would receive light energy from all the light rays 38. The light rays 38 would pass through the edge of the pupil 28 and eventually reach the retina 36. Because of the dimmer lighting, the patient's pupil 28 has dilated from its size shown in FIG. 2 to acquire more light energy at the retina 36. The widely dilated pupil occurs most readily under dim illumination when a person's attention is primarily drawn to distant objects.

Accordingly, the contact lens 10 increasingly transmits more of the light rays 38 as the patient's pupil size increases or dilates which passes through the lens region 12 outside of the annular region 18. The annular region 18 still serves to pass light through to the retina, yet outside of the focus of the pinhole 20. The patient is, therefore, better able to discern the same objects which were viewed under brighter conditions.

Figure 4:
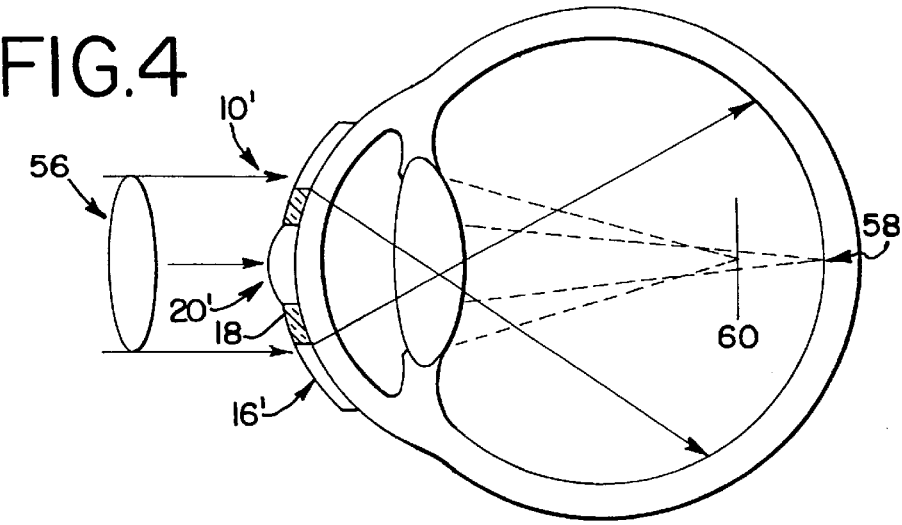
FIG. 4 illustrates a bi-powered contact lens constructed in accordance with the invention.

FIG. 4 shows a modified embodiment using a bi-powered lens 10'. The annular region 18 is as previously described. The convex surface 16' comprises two distinct optical corrections. In the area of the aperture 20', it is optically powered to correct intermediate distance vision. In the area outside of the annular region 18, an optical power is provided to correct far vision. Two focal points 58, 60 are thus provided from the foregoing corrective lens effects.

While the invention has been described with respect to the foregoing illustrative embodiments, those with skill in this art will recognize modifications and variations which will still fall within the scope of the invention.

What is claimed is:

1. A contact lens comprising
   an optically transparent lens body having a concave surface adapted to the patient's eye curvature and a convex surface, said convex surface having a first optical power to correct vision;
   said lens having three regions:
   (1) a first annular region of a second optical power said first annular region having a center;
   (2) at the center of said first annular region a substantially pinhole-lens aperture; and
   (3) a second annular region exterior to said first annular region;
   wherein during bright lighting conditions when the wearer's pupil constricts, vision is generally restricted to said pinhole lens aperture and during low light conditions when the wearer's pupil dilates, vision is allowed beyond said pinhole-lens aperture, permitting additional light to pass through said second annular region, and wherein said second optical power serves to deflect light passing through said first annular region from a focal point of said pinhole lens aperture.

2. The contact lens of claim 1 wherein said first region is annular in shape with a radial width in the range of about 0.5 to about 4 mm.

3. A contact lens comprising:
   a lens body having a first surface substantially configured to conform to the eye curvature of the wearer, and a second surface optically configured in conjunction with said first surface to correct the vision of the wearer selectively at a focus between and including far and near objects;
   a pinhole optical aperture formed in said lens body which has a light focus;
   said lens body further having a first region surrounding said pinhole aperture which passes light therethrough but diverts said light passing therethrough from said pinhole light focus.

4. The contact lens of claim 3 further including a second region radially outward from said first region which has a configuration for correcting the vision of the wearer at a focus between and including near and far objects.

5. The contact lens of claim 3 wherein said second surface has an optical correction selected from one of aspheric, convex, concave, and toric correction.

6. The contact lens of claim 3 wherein said first surface has an optical correction selected from one of aspheric and toric correction.

7. The contact lens of claim 3 wherein said pinhole aperture has a diameter in the range of about 0.5 to about 4 mm.

8. The contact lens of claim 1 or 3 wherein said first region refracts light substantially outside the region of the fovea.

9. The contact lens of claim 1 or 3 wherein said first region refracts light substantially outside the region of the fovea but upon the retina.

10. The contact lens of claim 3 wherein said first region has an optical transmissivity in the range of between about 1 and about 90 percent in visible light.

11. The contact lens of claim 10 wherein said first region is tinted in a color to cosmetically change the iris color of the wearer.

12. A lens comprising:
    a lens body;
    a pinhole optical aperture formed in said lens body which has a light focus;
    said lens body further having a region surrounding said pinhole aperture, said region passing light therethrough but diverting said light passing therethrough from said pinhole light focus.

13. A non-surgical-method for treating visual aberrations, comprising the steps of:
    fitting at least one eye of a wearer with a first contact lens configured to correct the vision of the wearer at a focus between and including near and far objects;
    providing on said contact lens a pinhole aperture which serves to bring light to a focus and an annular non-corrective segment of selected optical transmissivity surrounding said pinhole aperture, said annular segment functioning to direct light passing therethrough from said focus.

14. A contact lens comprising
    an optically transparent lens body having a concave surface adapted to the patient's eye curvature and a convex surface, at least one of said surfaces having a first optical power to correct vision;
    said lens having:
    (1) a first region of a light transmissive and light directing optical characteristic;
    (2) at about the center of said first region a substantially pinhole-lens aperture;
    wherein during bright lighting conditions when the wearer's pupil constricts, vision is generally restricted to said pinhole lens aperture, and during low light conditions when the patient's pupil dilates, vision is allowed beyond said first region, permitting additional light to pass through said lens, and wherein said first region serves to direct light passing therethrough from a focal point of said pinhole lens aperture.

15. A contact lens comprising
    an optically transparent lens body having a concave surface adapted to the patient's eye curvature and a convex surface, at least one of said surfaces having a first optical power to correct vision;
    said lens having:
    (1) a first generally annular region of a light transmissive and light directing optical characteristic;
    (2) at about the center of said first region a substantially pinhole-lens aperture;
    (3) a second generally annular region having light transmissive characteristic radially outward from said first region;

wherein during bright lighting conditions when the wearer's pupil constricts, vision is generally restricted to said pinhole lens aperture, and during low light conditions when the patient's pupil dilates, vision is allowed beyond said first region into said second region, permitting additional light to pass through said lens, and wherein said first region serves to direct light passing therethrough from a focal point of said pinhole lens aperture.

16. The contact lens of claim 15 wherein said second annular region is provided with a vision correcting power.

17. The contact lens of claim 16 wherein said pinhole lens aperture is provided with a vision correcting power different from said second annular region.

18. A lens comprising:

an optically transparent lens body;

said lens body having:
(1) a first region of a light transmissive and light directing optical characteristic;
(2) at about the center of said first region a substantially pinhole-lens aperture;

said first region serving to direct light passing therethrough from a focal point of said pinhole lens aperture.

19. A method for modifying vision comprising the steps of:

providing an optically transparent lens body, said body having:
(1) a first region of a light transmissive and light directing optical characteristic;
(2) at about the center of said first region a substantially pinhole-lens aperture; and fitting said lens body to a patient in a manner wherein during bright lighting conditions when the wearer's pupil constricts, vision is generally restricted to said pinhole lens aperture, and during low light conditions when the patient's pupil dilates, vision is allowed beyond said first region, permitting additional light to pass through said lens, and wherein said first region serves to direct light passing therethrough from a focal point of said pinhole lens aperture.

20. The method of claim 19 wherein said lens body is a contact lens having a a concave surface adapted to the patient's eye curvature and a convex surface, at least one of said surfaces having a first optical power to correct vision.

* * * * *

UNITED STATES PATENT AND TRADEMARK OFFICE
CERTIFICATE OF CORRECTION

PATENT NO.   : 5,980,040
DATED         : November 9, 1999
INVENTOR(S)  : David H. Xu et al.

It is certified that error appears in the above-identified patent and that said Letters Patent is hereby corrected as shown below:

Claim 1,
Line 7, after "power" insert --,-- (comma).

Claim 6,
Line 1, delete "claim 3" and substitute --claim 5-- in its place.

Claim 20,
Line 2, delete "having a" and substitute --having-- in its place.

Signed and Sealed this

Nineteenth Day of June, 2001

Attest:

NICHOLAS P. GODICI
Attesting Officer
Acting Director of the United States Patent and Trademark Office